United States Patent [19]
Lee

[11] Patent Number: 5,192,347
[45] Date of Patent: Mar. 9, 1993

[54] FILTER ASSEMBLY

[75] Inventor: Joung C. Lee, Samgye, Rep. of Korea

[73] Assignee: Samsung Electronics Co., Ltd., Suweon, Rep. of Korea

[21] Appl. No.: 804,596

[22] Filed: Dec. 10, 1991

[30] Foreign Application Priority Data

Dec. 10, 1990 [KR] Rep. of Korea ............... 90-19435

[51] Int. Cl.$^5$ ................. B01D 29/05; B01D 29/44
[52] U.S. Cl. .................................... 55/359; 55/481; 55/496; 55/511
[58] Field of Search ........ 55/354, 359, 481, 495–499, 55/501, 511

[56] References Cited

U.S. PATENT DOCUMENTS

| | | | |
|---|---|---|---|
| 2,118,271 | 5/1938 | Slayter | 55/496 X |
| 2,138,874 | 12/1938 | Myers | 55/359 |
| 2,336,765 | 12/1943 | Adams | 55/481 X |
| 3,280,538 | 10/1966 | Schwarz | 55/501 X |
| 3,360,120 | 12/1967 | Getzin | 55/359 X |
| 3,447,691 | 6/1969 | Andrews et al. | 55/511 X |
| 3,683,596 | 8/1972 | Ashley | 55/359 |
| 3,695,008 | 10/1972 | Neumann | 55/501 X |
| 3,707,046 | 12/1972 | DeBaun | 55/496 X |
| 3,793,813 | 2/1974 | McAllister | 55/481 |
| 4,373,635 | 2/1983 | Mules | 55/359 X |
| 4,450,964 | 5/1984 | Wood | 55/481 X |
| 4,521,234 | 6/1985 | Peebles, Jr. et al. | 55/481 |
| 4,976,753 | 12/1990 | Huang | 55/501 X |

FOREIGN PATENT DOCUMENTS

| | | | |
|---|---|---|---|
| 2338735 | 8/1977 | France | 55/495 |
| 55-079024 | 6/1980 | Japan | 55/354 |
| 56-067545 | 6/1981 | Japan | 55/481 |

OTHER PUBLICATIONS

Research Disclosure (Dec. 1979), No. 188, pp. 693–694, No. 18857 entitled "Device and method for removing a filter".

Primary Examiner—Robert Spitzer
Attorney, Agent, or Firm—Burns, Doane, Swecker & Mathis

[57] ABSTRACT

A filter assembly is removably mounted in an air conditioning unit. The assembly comprises a housing in which a filter panel is mounted. The housing includes a dust collecting box disposed beneath the filter panel. Two screens are mounted in the housing in a rolled-up condition at one side of the filter panel. The screens can be manually unrolled so as to extend across front and rear faces of the filter panel to resist the scattering of dust into the atmosphere when the assembly is removed from the air condition unit.

22 Claims, 4 Drawing Sheets

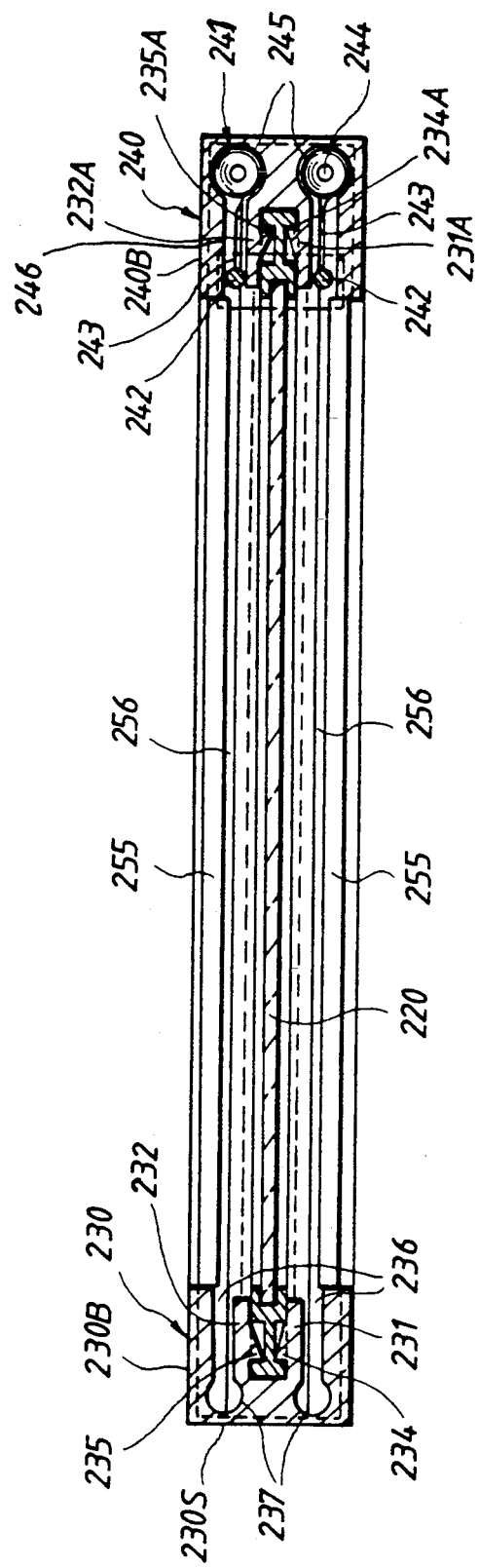

FILTER ASSEMBLY

FIELD OF THE INVENTION

The present invention relates to a filter assembly for an air conditioning system, and more particularly to a filter assembly which prevents dust collected on the side surface of the filter from scattering during removal of the filter assembly from its operative position in the air conditioning system thereby maintaining the cleanliness of the area housing the air conditioning system.

BACKGROUND OF THE INVENTION

An air conditioning system which utilizes a filter assembly includes devices which cool, heat, dehumidify, humidify, and clean air flowing through it. The air conditioning system uses a filter installed at an intake portion located at the front face of the system. The filter prevents the entry of foreign particles entrained in the indoor air flowing into the system for treatment. Such a filter is usually of a rectangular shape and comprises a filter batt which is usually a cloth material. After a predetermined time particulate matter clogs the surface of the filter requiring that the filter be cleaned. The air conditioning system is generally positioned at a point higher than a user's height, i.e. proximate the ceiling, so as to perform most efficiently. In removing the conventional dust laden filter from the air conditioning system with an unprotected surface, dust is scattered on the person effecting the removal thereby eliciting an unpleasant feeling and causing an unhealthy environment. To collect falling dust a prior art filter provides a collector integrally formed at a bottom frame thereof. Such a typical structure is disclosed in Japanese Patent Laid-Open No. 1985-175937. However, a problem occurs in that dust laden on the surface of the filter is scattered during the removal with even a slight jarring of the filter. Japanese Patent Laid-Open No. 1985-62525 discloses another structure for preventing the dispersion of dust. Nevertheless, this has a problem in that microscopic particles cannot be caught by the filter and the finer dust on the rear surface of the filter is scattered throughout all the directions.

SUMMARY OF THE INVENTION

The object of the present invention is to provide an improved filter assembly equipped with a screen for preventing the dust which is collected on the surface of a filter from scattering during removal.

Another object of the present invention is to provide a filter assembly equipped with a screen to prevent a filter collected dust from scattering during removal and with a filter that can be conveniently cleaned.

Briefly, in accordance with one aspect of the invention, an air intake section of an air conditioning system is provided with a filter assembly which includes a filter panel for removing particulate matter from air flowing into the air conditioning system, a pair of vertical housing members mounted removably to a pair of side frame members of the filter panel in an interfit manner, and a collecting box removeably mounted to a bottom frame of the filter panel and to the bottom portion of the vertical housing members for collecting dust falling from the surface of the filter panel.

One of vertical housing members includes a pair of screens which are rolled like a roller shape for a window, and the other vertical housing consists of a pair of receiving members for gripping each leading portion of the screen.

The filter panel consists of a filter batt and a circumferential support frame surrounding the batt, the frame consists of a top frame element and a bottom frame element having a pair of channels extending longitudinally throughout each thereof for guiding a movement of the screen, and further the frame consists of a pair of side frames running in a parallel manner between the top and bottom frame elements.

The collecting box contains a slider being interconnected with both leading portion of the screen for pulling away from a roll of the screen.

BRIEF DESCRIPTION OF THE INVENTION

The present invention will be further described with reference to the drawings, in which:

FIG. 4 is a traverse sectional view of the filter assembly of the present invention.

DETAILED DESCRIPTION

Figure 1:
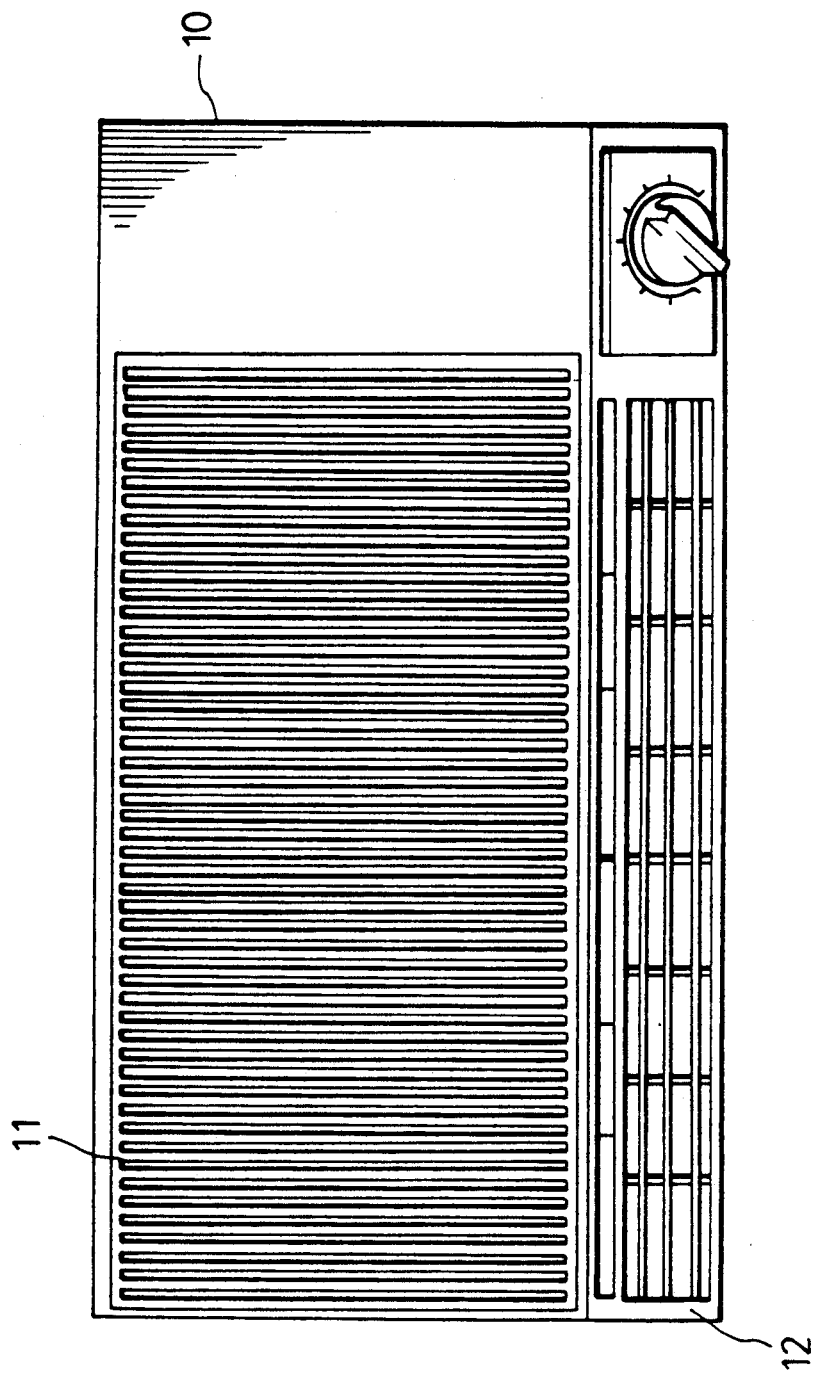
FIG. 1 is a front view of an air conditioner with the filter assembly of the present invention installed therein.

Referring now to FIG. 1, shown is an indoor unit of conventional separate type or wall mounted air conditioner. The indoor unit includes a body 10, an intake grill 11 with return air openings through which air to be treated enters the unit, and a exhaust 12 with air discharge openings through which air treated by the condenser (not shown) in the body 10 is discharged. A space is provided between the front of the condenser and the rear of the intake grill 11 for a filter assembly of the present invention to be slidably positioned therein.

Figure 2:
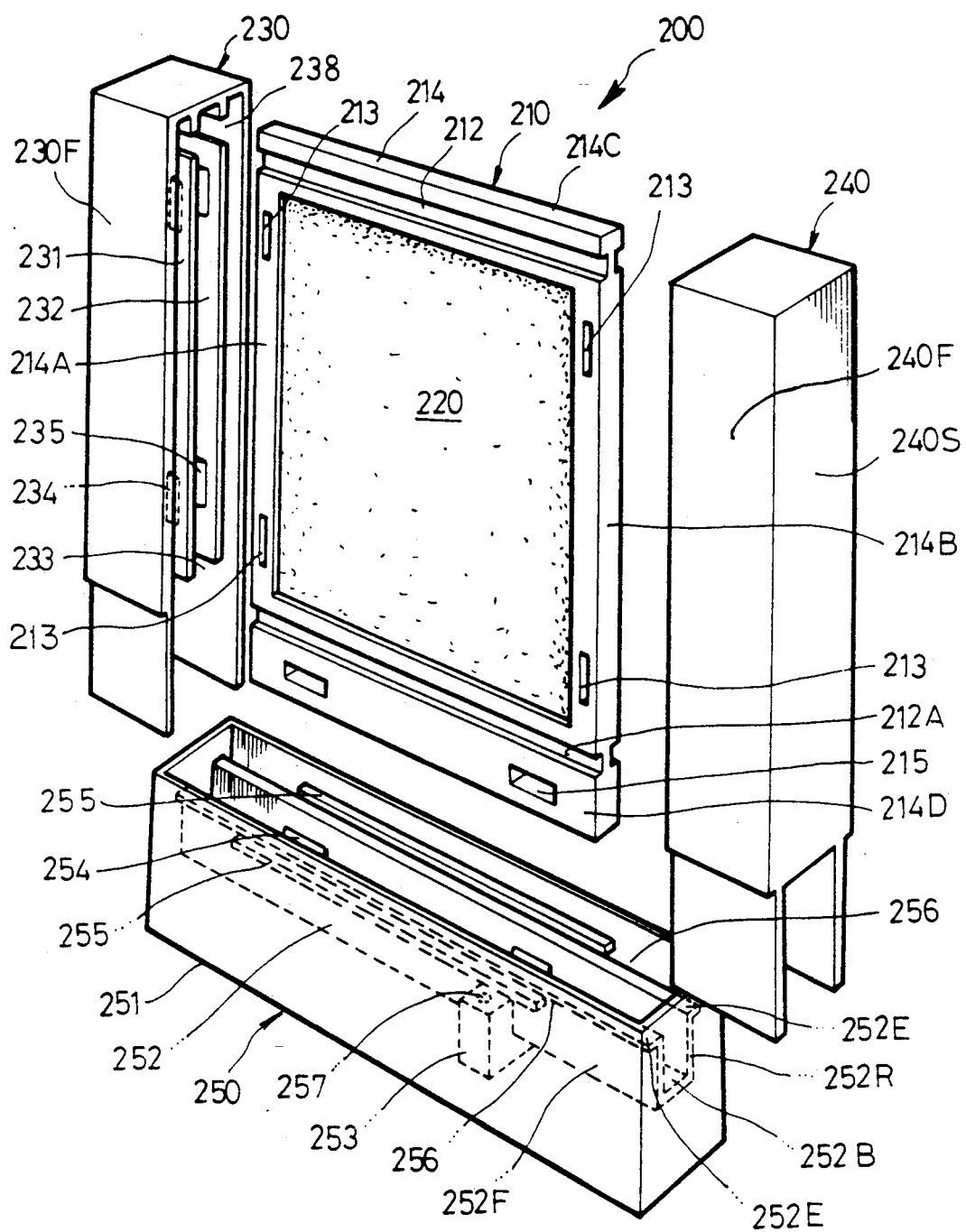
FIG. 2 is an exploded perspective view of the filter assembly of the present invention.
Figure 3:
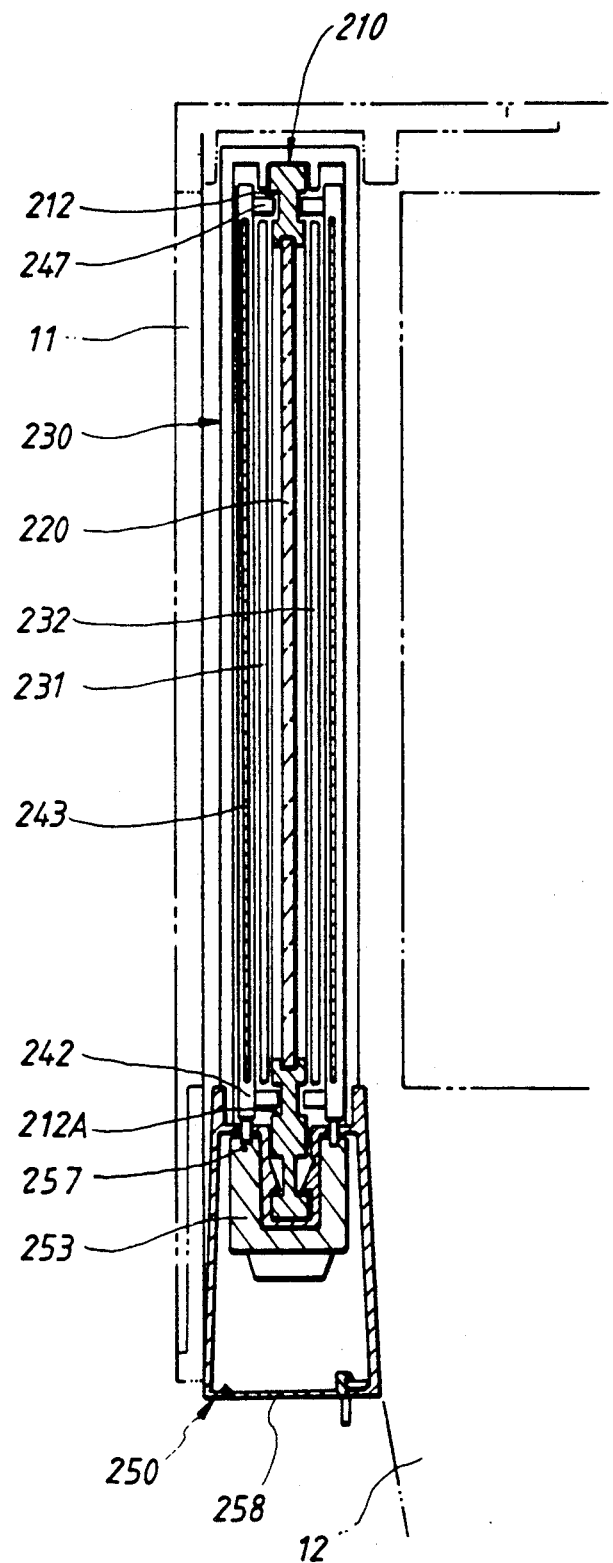
FIG. 3 is a vertical sectional view of the filter assembly of the present invention.

FIGS. 2, 3 and 4, depict a filter assembly 200 constructed in accordance with the present invention. The filter assembly 200 provides a filter panel 210 consisting of a filter batt 220 made of conventional cloth or the like, a rectangular support frame 214 surrounding the batt 220, made of a resin or like material by injection molding. The support frame 214 includes a top frame element 214C having a pair of channels 212 extending horizontally along the front and back of the top frame element and a bottom frame element 214D having a pair of channels 212A having the same configuration as channels 212. A pair of side frame elements 214A, 214B connect the top and bottom frame elements together to form support frame 214. Each side frame 214A, 214B has at least one depression 213 formed on the planar surface of each side frame near the batt 220. The bottom frame element 214D has at least one depression 215 formed therein near a bottom line of the channel 212A.

The filter assembly 200 also includes a housing comprised of a pair of rectangular columns 230, 240 in which column 230 has a front partition 231 and a rear partition 232. Between the front partition 231 and the rear partition 232 a securing portion 233 is defined. On the surface of the front partition 231 a plurality of elastic protrusive members 234 are integrally formed. And in the same manner a plurality of elastic protrusive members 235 are provided on the surface of the rear partition 232. The protrusive membes 234, 235 are employed to detachably secure the filter panel 210 to the securing portion 233 by being received into their respective depression 213 of the support frame 214. To detachably secure the opposite side frame of the filter panel 210 to column 240, this column 240 also has a front partition 231A having a protrusive member 234A and a rear partition 232A having a protrusive member 235A which are the same configuration as those of the column 230 but their arrangement is the mirror image of the components of column 230 (FIG. 4). Column 240 further provides a pair of slots 246, 246 and a pair of cavities 245, 245. Each slot and its respective cavity are connected to each other. The slots and cavities are defined between a front plate 240F and a side plate 240S and a rear plate. 240B of the column 240. Within the slots 246,246 and the cavities 245,245 are housed a pair of cover assemblies 241,241 for sheltering a front surface and a rear surface of the filter panel 210. The screen assembly 241 includes a leading rod 242 placed in the slot 246, a winding rod 244 placed in the cavity 245, and a cover member in the form of a screen 243. One end of the screen is attached to the leading. rod 242, and the other end of the screen is attached to the winding rod 244. Most of the screen 243 is wrapped on the winding rod 244 like a scroll, wherein the screen is contracted, to assume a retracted condition, and has a rewinding property since a spiral torsion spring is provided on the winding rod 244. An upper portion and lower portion of the leading rods 242,242 are situated adjacent the channel 212 and channel 212A, respectively. Guiding blocks 247 are attached to the rods 242 and are slidably disposed in the channels 212 for enhancing a smooth movement of the leading rods 242. Returning to the column 230, the column 230 further provides a pair of slots 236,236 and a pair of terminal cavity portions 237,237. Each slot 236 and its respective terminal cavity portion 23 are connected to each other, and are defined between a front plate 230F and a side plate 230S and a rear plate 230B of the column 230. The slot 236 is sized in order that the leading rod 242 is moved freely therein. The terminal portion 237 may have a grip member for use in holding the leading rod 242.

Moreover, the filter assembly 200 provides a dust collecting box 250 which includes a body 251, a receptable 252 and a slider 253. At an upper surface of the body 251 is provided an opening which is sized so as to receive the columns 230, 240 which are assembled with the filter panel 210. The receptacle 252 consists of a front wall 252F, a rear wall 252R and a bottom plate 252B as shown in FIG. 2. Further, each traverse end of the receptacle 252 is attached integrally on each side wall of the body 251. At surfaces facing each other on the front wall 252F and the rear wall 252R a plurality of protrusive members 254 is provided for detachably connecting with the depression 215 of the filter panel 210. Extending against each other at upper portions of the front wall 252F and the rear wall 252R, flanges 252E,252E are provided. Mutually facing page portions 255, 255 are provided on internal surfaces of a front wall and a rear wall of the body 251. Between the guide portion 255 and the flange 252E is defined a track 256 for guiding the movement of the leading rod 242 of the screen assembly 241. The slider 253 is formed as to slide along the exterior surface of the receptacle 252. The bottom ends of the leading rods 242 are inserted into bores 257 formed in the slider 253. Therefore, the slider 253 is employed to move the leading rods 242,242 with the screens 243,243 to the terminal portion 237 and thereby extend the screens across the front and rear faces of the filter batt, wherein the screens are expanded (i.e., enlarged from their contracted (reduced-size) condition. To insert completely the leading rod 242 into the terminal portion 237 the column 230 has slots 238,238 disposed at the upper portion of partitions 231,232 of the column 230 and aligned with the channels 212,212 of the filter panel 210. At the bottom plate of the body 251 a conventional hinge case or cover 258 is provided to provide access to the slider 253 housed in the body 251.

In a typical installation as shown in FIG. 3, the above fitted filter assembly 200 is mounted in the space provided at the rear of the grill 11. During the air conditioning process, air is drawn through the opening of the grill 11 and passes through the filter batt 220 of the filter assembly 200 of the present invention. The filter batt 220 removes particulate matter such as dust. The dust accumulates on the front surface of the filter batt 220, and also microscopic particles passing the filter batt 220 are accumulated on the rear surface of the filter batt 220. To prevent making contact with the dust from the filter batt 220, the user opens the cover 258 and grips the slider 253. As slider 253 moves from the column 240 toward the column 230, the guiding blocks 247 of the leading rods 242,242 move slidably along the channel 212 and the channel 212A accompanied by the screens 243,243 while the lower portion of the leading rods 242,242 pass through the tracks 256,256. The leading rods 242,242 pass through the sliding slots 236,236 and reach the terminal portions 237,237. With the leading rods 242,242 disposed in the terminal portion 237,237, the cover 258 is closed. The above prepared filter assembly 200 is released from the indoor unit. Since the screens 243,243 shelter the front surface and the rear surface of the filter panel 210, the dust laden on the surfaces is not scattered over the environment but falls in the body 251 of the box 250. Removal of the filter panel 210 and the columns 230,240 from the box 250 can be accomplished by simply pulling each upper portion of front and rear walls of the body 251 outwardly to slightly deform the front wall 252F and the rear wall 252R of the receptacle 252, and outwardly to allow the protrusive members 254 to become disengaged from the depression 215. Also, removal of the filter panel 210 from the columns 230,240 can be accomplished in a same manner as above. The protrusive members 234, 235 of the column 230 and the protrusive members 234A, 235A of the column 240 can then be easily disengaged from the depression 213. The removed filter panel 210 can wash conveniently. The complete cleaned filter panel 210 can be assembled by reversing the above disassembly procedure.

In the above structure, whenever the filter assembly is extracted from the body of the air conditioning system the dust laden on the filter batt cannot scatter over the environment, and with the periodic cleaning of the filter assembly the air conditioning system will use less energy and require less maintenance.

What is claimed:

1. An air filter assembly adapted to be removably mounted in an air treating unit, comprising:
   housing means having sides defining a space for receiving a filter panel, and
   cover means mounted in said housing means for displacement between a retracted position wherein said cover means is disposed in a contracted condition within said housing and an extended position wherein said cover means is disposed in an expanded condition within said housing, said cover means being disposed adjacent one of said sides when in said contracted position to enable said filter to remove dust from an air flow, and being displaceable from said contracted position to said expanded position wherein it extends across at least one face of the filter panel to resist the escape of dust from the filter panel to the surrounding environment during handling of said air filter assembly.

2. An air filter assembly according to claim 1, wherein said cover means comprises two cover members for covering front and rear faces of the filter panel.

3. An air filter assembly according to claim 1, wherein said cover means comprises a screen.

4. An air filter assembly according to claim 1, wherein said cover means is wound-up when in said retracted position and is unwound when in said extended position.

5. An air filter assembly according to claim 1, wherein said cover means travels horizontally between said retracted and extended positions.

6. An air filter assembly according to claim 1, wherein said housing means comprises first and second housing members arranged to be disposed on opposite sides of the filter panel, said cover means being situated within one of said housing members when in said retracted position, the other of said housing members including means for receiving an end of said cover means when said cover means is in said extended position.

7. An air filter assembly according to claim 6 including a filter panel, said filter panel including frame elements arranged to carry a filter batt, said frame elements including guide means for guiding said cover means during movement thereof between said retracted and extended positions.

8. An air filter assembly according to claim 1 including a manual actuator operably connected to said cover means for displacing said cover means between said retracted and extended positions.

9. An air filter assembly according to claim 8 including an openable case for enclosing said actuator.

10. An air filter assembly according to claim 8, wherein said actuator comprises a slide.

11. An air filter assembly according to claim 1, wherein said housing means includes a dust collecting box disposed beneath said filter panel.

12. An air filter assembly according to claim 11, wherein said cover means comprises two cover members for covering front and rear faces of the filter panel.

13. An air filter assembly according to claim 1 including a filter panel, said filter panel comprising frame elements arranged to carry a filter batt, said frame elements being removably connected to said housing means.

14. An air filter assembly comprising:

a filter panel comprising frame elements arranged to carry a filter batt;
housing means defining a space in which said filter panel is removably mounted, said frame including:
opposing frame members arranged to be disposed on opposite sides of said filter panel, and
a dust collecting box disposed beneath said filter panel, and
first and second screens disposed in a rolled-up retracted position in a frame member of one of said housing members and arranged to be unrolled and extended across said space on opposite sides of said filter panel to cover front and rear faces of said filter panel to resist the escape of dust from the filter panel into the surrounding environment during handling of said air filter assembly.

15. An air filter assembly according to claim 14, wherein said frame elements include guide means for guiding said screens during movement thereof between said retracted and extended positions.

16. An air filter assembly according to claim 15 including a manual actuator connected to said screens for displacing said screens between said retracted and extended positions.

17. An air filter assembly according to claim 16, wherein said actuator is slidably mounted on said dust collecting box.

18. An air filter assembly according to claim 16, wherein said filter panel is removably connected to said housing means.

19. An air filter assembly according to claim 16, wherein said screens are arranged to travel horizontally between said retracted and extended positions.

20. An air filter assembly according to claim 19, wherein said other of said housing members includes means for receiving an end of each screen when said screens are in their extended positions.

21. An air filter assembly adapted to be removably mounted in an air treating unit, comprising:

housing means having sides defining a space for receiving a filter panel, and
a pair of covers mounted in said housing means, each cover being mounted for displacement between a retracted position and an extended position, each cover being disposed adjacent a respective one of said sides when in said retracted position to enable said filter to remove dust from an air flow, and being displaceable from said retracted position to said extended position wherein it extends across a respective face of the filter panel to resist the escape of dust from the filter panel to the surrounding environment during handling of said air filter assembly, wherein each cover is wound-up when in said retracted position and is unwound when in said extended position.

22. An air filter assembly according to claim 21, wherein said housing means includes a dust collecting box disposed beneath said filter panel.

* * * * *